(12) United States Patent
Rodriquez et al.

(10) Patent No.: US 12,420,595 B2
(45) Date of Patent: Sep. 23, 2025

(54) TIRE WITH IMPROVED SNOW PERFORMANCE

(71) Applicant: Bridgestone Europe NV/SA [BE/BE], Zaventem (BE)

(72) Inventors: Guiseppe Rodriquez, Rome (IT); Davy Ruggiero, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 0 days.

(21) Appl. No.: 18/282,565

(22) PCT Filed: Mar. 17, 2022

(86) PCT No.: PCT/EP2022/057082
§ 371 (c)(1),
(2) Date: Sep. 18, 2023

(87) PCT Pub. No.: WO2022/195049
PCT Pub. Date: Sep. 22, 2022

(65) Prior Publication Data
US 2024/0174031 A1   May 30, 2024

(30) Foreign Application Priority Data

Mar. 19, 2021 (IT) .................. 102021000006614

(51) Int. Cl.
*B60C 11/13* (2006.01)
(52) U.S. Cl.
CPC ..... *B60C 11/1307* (2013.01); *B60C 2011/133* (2013.01); *B60C 2011/1338* (2013.01)

(58) Field of Classification Search
CPC ......... B60C 11/1307; B60C 2011/1338; B60C 2011/133
See application file for complete search history.

(56) References Cited

U.S. PATENT DOCUMENTS

| | | | | |
|---|---|---|---|---|
| 5,783,002 A | * | 7/1998 | Lagnier | B60C 11/13 152/209.1 |
| 2001/0032691 A1 | * | 10/2001 | Ohsawa | B60C 11/13 152/209.18 |

FOREIGN PATENT DOCUMENTS

| | | | | |
|---|---|---|---|---|
| EP | 1048488 A2 | | 11/2000 | |
| JP | 03057704 A | | 3/1991 | |
| JP | 11-151912 A | * | 6/1999 | |
| JP | 2001-001722 A | * | 1/2001 | ......... B60C 11/1218 |
| JP | 2005231600 A | | 9/2005 | |
| JP | 2010120427 A | | 6/2010 | |

OTHER PUBLICATIONS

Machine translation for Japan 11-151912 (Year: 2024).*
Machine translation for Japan 2001-001722 (Year: 2024).*
International Search Report, corresponding application No. PCT/EP2022/057082, Jun. 20, 2022, 5 pages.

* cited by examiner

*Primary Examiner* — Steven D Maki
(74) *Attorney, Agent, or Firm* — Patterson Intellectual Property Law, PC (57) ABSTRACT

The present invention relates to a tire (1) having an external surface (10) with innovative profile at perimetral walls (2, 3, 4, 5) of the tread blocks (a, b), for improving snow performances. The perimetral walls present a 3-dimensional voids/protrusions (9, 8) pattern, configured to improve snow digging and snow trapping effects.

19 Claims, 6 Drawing Sheets

FIG.1a

PRIOR ART

PRIOR ART

PRIOR ART

FIG.2a

PRIOR ART

FIG.2b

PRIOR ART

FIG.2c

PRIOR ART

FIG.3a

PRIOR ART

SECTION B-B

FIG.3b

PRIOR ART

TIRE WITH IMPROVED SNOW PERFORMANCE

TECHNICAL FIELD OF THE INVENTION

The present invention relates to a tire having an innovative 3-D pattern profile at external perimetral walls of the tread land portions, for improving snow performances with reference to snow digging and snow trapping effects.

Background

Tire performance on snow is linked to several mechanisms depending mainly on tread compound and pattern features (void ratio/distribution, edges geometry/number/distribution, tread block shape/stiffness).

In particular, the main mechanisms concurring to such kind of performance are the "snow digging" and the "snow trapping" effects, the former dealing with the penetration of tread in the snowpack, the latter dealing with the capability of tread voids to collect and compress snow.

In particular, snow digging is about the capability of tread pattern elements (sipes, cuts, edges) to penetrate into snowpack and to provide gripping for traction/braking/cornering maneuvers.

Snow trapping is instead the capability of macro-voids of the tread pattern (grooves, lugs, cranks, etc.) to collect and compress snow in order to take advantage the snow-snow friction mechanism as additional contribution to snow grip.

With regard to snow trapping effect, having a flat surface as longitudinal/lateral side wall of tread blocks, even if usual, is not a good solution for the enhancement of this mechanism.

One of the most common approaches adopted to increase snow performance is realizing tread blocks whose contours are shaped like a simple polygonal chain (e.g. square-wave, saw tooth shape, "zig-zag" shape, etc.) in order to increase the points where snow can be racked up: this improve the snow trapping mechanism.

Figure 1A:
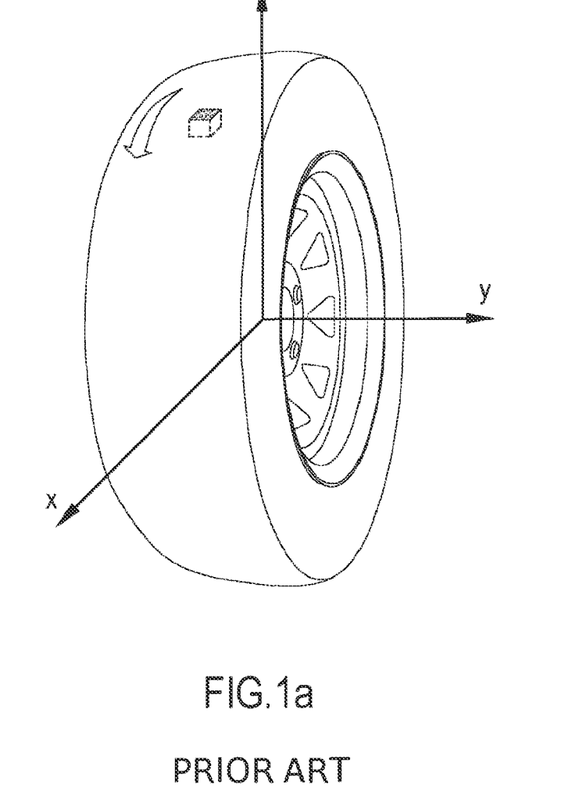
FIG. 1a shows a schematic prospective view of a first prior art embodiment of a tire.
Figure 1B:
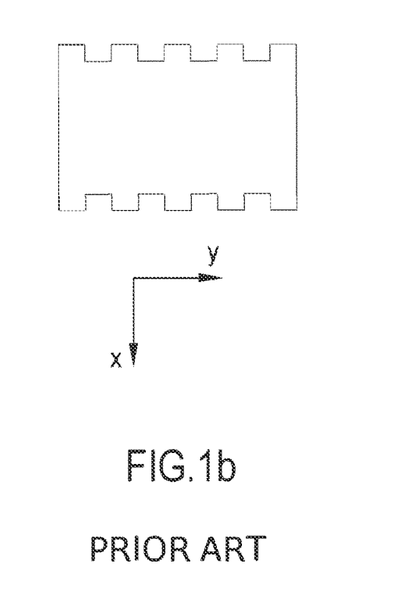
Figure 1C:
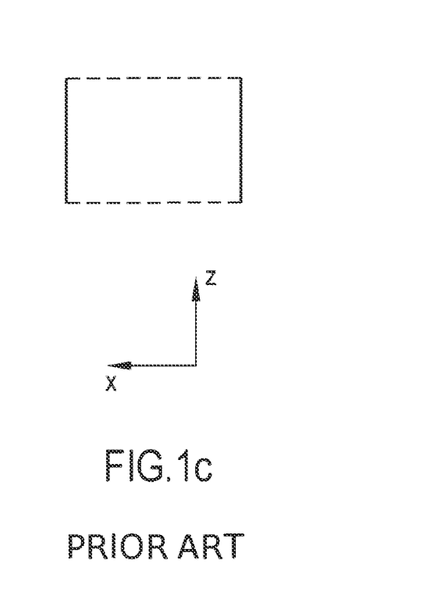

As way of example, a first prior art solution is shown in FIGS. 1a-1c. The tread block cross profile does not change along the height of the block itself, and presents voids pattern features (cuts, notches, "zig-zag" lines) which have been basically "extruded" along tire radial direction, that is along block height z.

Figure 2A:
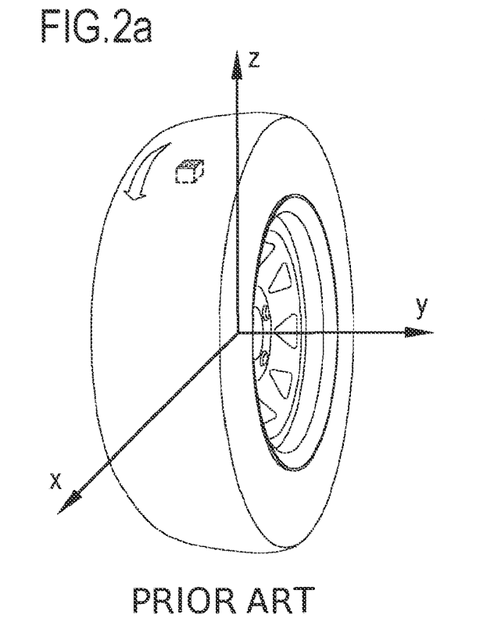
FIG. 2a shows a schematic prospective view of a second prior art embodiment of a tire.
Figure 2B:
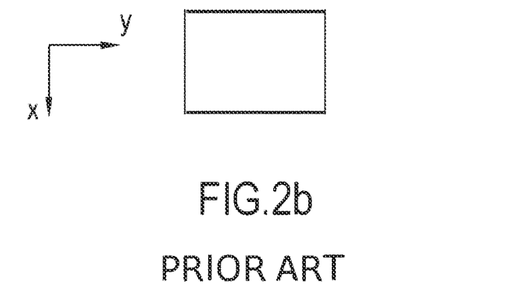
Figure 2C:
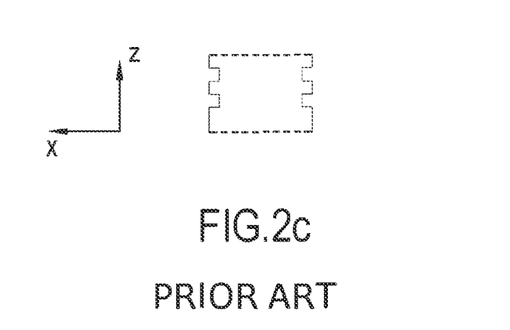

A second prior art solution shown in FIGS. 2a-2c is to have a tread block cross profile which changes along the height of the block itself (direction z) but remains flat along the block width (direction x) and the block length (direction y).

Figure 3A:
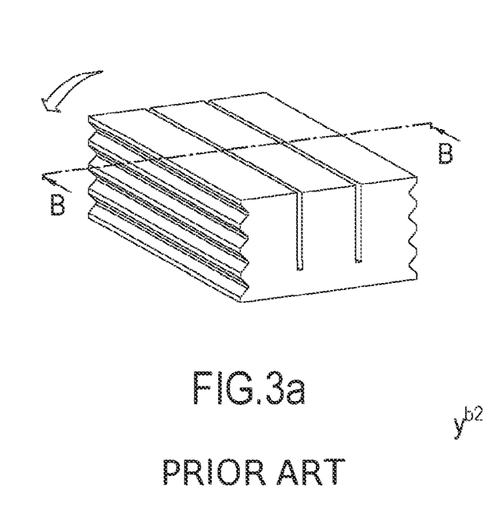
FIG. 3a shows a schematic, prospective view of a third prior art tread block.
Figure 3B:
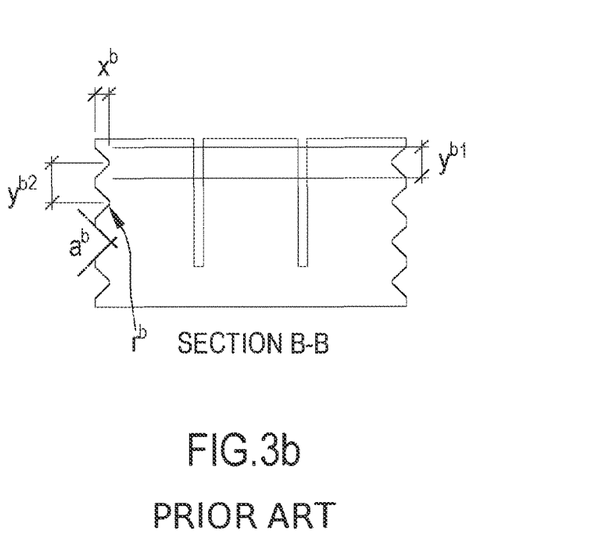

In FIGS. 3a and 3b, the external surfaces of tread block perimetral walls of another prior art solution are shown. The external surface in provided with rectilinear cuts realized by extruding a "zig-zag" profile (featuring rounds, too) along the block width. Each cut has a triangular shaped profile.

In all the above known solutions, the variable profile of the tread block's walls is applied only in one direction, which could be, alternatively, the width/length or the height.

All these kinds of known embodiments have the limitation to not exert the whole block walls to trap snow and increase snow performance.

SUMMARY OF THE INVENTION

The technical problem posed and solved by the present invention is therefore to provide a tire which allows overcoming the disadvantages mentioned above with reference to the known art.

This problem is solved by a tire according to claim 1. Preferred features of the present invention are object of the dependent claims.

Target of the subject idea is to provide a solution to enhance the "snow trapping" effect by introducing a series of 3-dimensional (3D) shaped additional pattern elements (e.g. cuts, notches, wavy voids) on perimetral wall surfaces of tread land portions, in particular at perimetral wall surfaces of tread blocks.

The above 3D features (basically small patterned voids and/or protrusions) are shaped and distributed in such a way that snow is trapped and compressed inside them, so providing an increased contribution to snow grip. The problem solved is that of improving snow performance by enhancing the overall snow trapping mechanism at tread land portions level on top of tread compound properties' design.

The present invention provides a tire having an external surface with innovative 3D profile at perimetral walls of the tread land portions, for improving snow performances. The perimetral walls present a 3D voids (or recesses) and/or protrusions pattern, configured to improve snow digging and snow trapping effects.

In the context of the present application, the terms 'voids' and 'recesses' are to be intended as synonyms.

A first key aspect of the proposed invention consists in that voids (cuts, notches, grooves, etc.) and/or protruding elements are applied to longitudinal walls of the tread land portions (both leading and trailing with respect to tire rolling direction) and/or lateral walls in such a way a variable profile is possible contemporarily along both land portions height and width/length.

By applying a variable profile in both the height and width/length directions, a complex 3D pattern can be shaped, so that the whole land portions walls can be exerted to increase the snow trapping mechanism, and in turn the overall snow grip potential.

The entire side walls of the tread land portions can be affected by this 3D pattern, so that the total surface area involved in such mechanism is potentially much higher with respect to that of the prior art solutions. This leads to an increased number of voids that enhances snow trapping capability and so the overall snow grip.

More specifically, a first technical benefit of the invention is that edge density (very important for both snow trapping and digging effects) is increased.

Furthermore, by a proper optimization of tread land portion wall profile, snow trapping can be improved locally (at tread land portion level), providing a higher volume of trapped snow and with higher density, too.

In addition, voids are introduced in such a way that land portion stiffness is not affected, and in particular not decreased. This is very important for all the others performance (i.e. dry, wet) which could be negatively affected by snow-oriented design intents, such us lowering bock stiffness, indeed.

It is crucial to note that the proposed invention provides a solution to enhance the snow trapping effect by introducing a series of 3D small "voids" (cuts or recesses) and/or protruding elements as additional pattern elements on longitudinal/lateral side wall surfaces of tread land portions, not on internal surfaces thereof. In other words, the 3D pattern is provided onto perimetral, external surfaces of the tread land portions, which are designed to penetrate in the snow (or, more in general, in the ground). The 3D small voids, positioned with a specific layout, are shaped and distributed in such a way snow is trapped and compressed inside them, so providing an increased contribution to snow grip.

The proposed solution is to be potentially applied to all tires for which an overall snow performance improvement (braking/traction/handling/slalom) is required, but of course its application to all kind of tires is advantageous.

Other advantages, features and modes of employ of the present invention will become evident from the following detailed description of some embodiments, presented by way of example and not of limitation.

BRIEF DESCRIPTION OF THE DRAWINGS

Reference will be made to the Figures of the enclosed drawings, wherein:

FIGS. 1b and 1c show, respectively, a plan view and a lateral view of a first prior art tread block comprised in the embodiment of FIG. 1a;

FIGS. 2b and 2c show, respectively, a plan view and a lateral view of a second prior art tread block comprised in the embodiment of FIG. 2a;

FIG. 3b shows a lateral section view of the third prior art tread block of FIG. 3a;

FIGS. 4b and 4c show, respectively, a plan view and a lateral view of a preferred embodiment of tread block according to the present invention, comprised in the tire of FIG. 4a;

The thicknesses and curvatures shown in the Figures introduced above are to be understood as purely exemplary and are not necessarily shown in proportion. Moreover, in said Figures some layers/components of the tire may have been omitted, for a clearer illustration of aspects of the present invention.

DETAILED DESCRIPTION OF PREFERRED EMBODIMENTS

Hereinafter, several embodiments and variations of the invention will be described, with reference to the Figures introduced above.

Moreover, the different embodiments and variants described in the following are possibly employed in combination, when they are compatible.

Figure 4A:
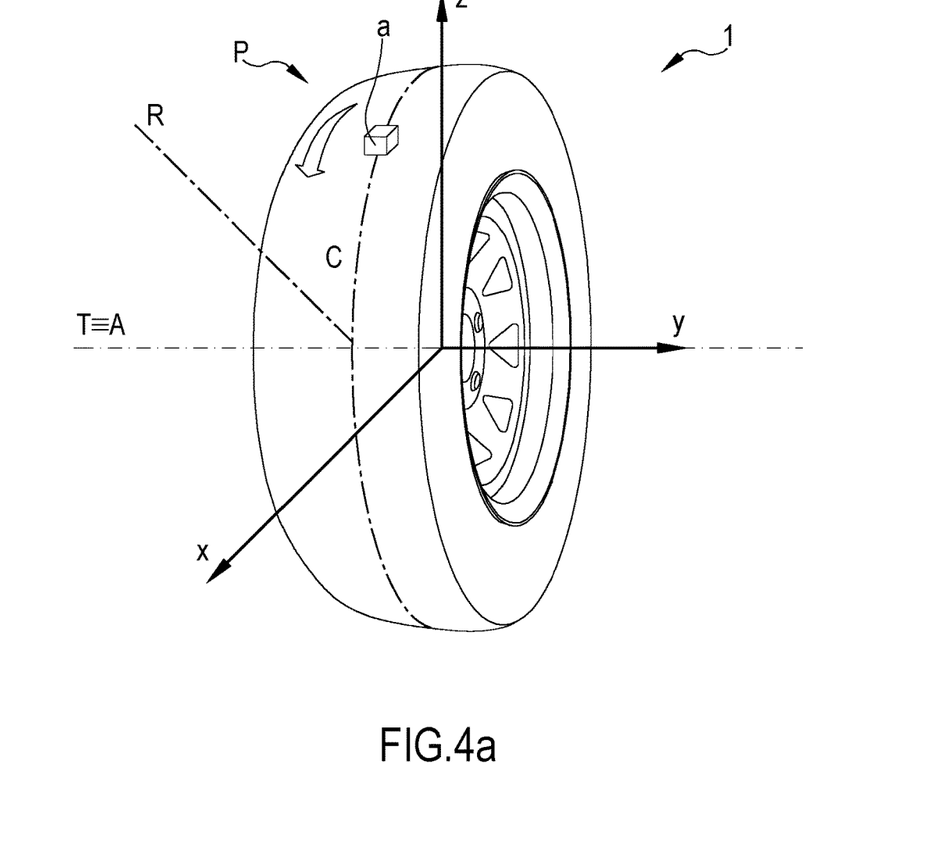
FIG. 4a shows a schematic prospective view of a preferred embodiment of a tire according to the present invention.

With reference to FIG. 4a, a preferred embodiment of a tire 1 according to the present invention is shown, including an external tread portion P, which comprises at least a tread block a.

According to the present disclosure, it is intended that a tread portion could refer to, or comprise, a central, middle or/and shoulder land portion of a tread. Still according to the present disclosure, all the features of the invention which in the following are referred to a tread block exemplary provided with a prismatic shape, are intended to be applied also to tread blocks, or more in general to tread land portions, provided with different and even more complex shapes, e.g. provided with V-shaped ("palm" shaped) profiles.

The tire 1 presents a circumferential direction C, a radial direction R and a transversal direction T, said transversal direction being a direction parallel to the rotation axis A of the tire. For better clarity, an arrow indicates the rolling direction of the tire 1.

In the exemplary view of FIG. 4a, the transversal direction T and the rotation axis A are represented as being coincident.

Furthermore, to ease the following description of the tread block geometry, in FIG. 4a a Cartesian coordinate system is given, which is intended to be the local reference system of the tread block, defined by a longitudinal axis x, a transversal axis y and a sagittal axis z. The longitudinal axis x is locally tangent to the circumferential direction C, the transversal axis y is parallel to the rotation axis A and the sagittal axis z is locally coincident with the radial direction R.

The tread portion P, or in particular, according to the present example, the tread block a, comprises a plurality of lateral perimetral faces or walls, which according to the present disclosure are intended to be external walls of the block a, for example walls facing macro-voids or facing other blocks, and not inner walls of the tread block facing micro-voids such as, for example, sipes' walls. The perimetral walls are those which penetrate and engage with the snow, or, more in general, with the ground, when the tire 1 is in use.

According to the invention, at least a portion of an external surface of one of said perimetral walls bears a 3-dimensional (3D) pattern of recesses and/or protrusions.

According to the invention, also embodiments comprising a 3D only-recesses pattern and a 3D only-protrusions pattern are foreseen.

In other words, the 3D pattern comprises recesses and/or protrusions alternating to each other according to at least two spatial directions, preferably perpendicular to each other, of the same external surface. Preferably, recesses and/or protrusions alternate to each other according to two main directions which are perpendicular to each other and define the extension, according to a plan view, of the concerned external surface. As way of example, with reference to the above Cartesian coordinate system, such two directions could be a transversal/longitudinal direction and a sagittal direction. Said 3D pattern is configured to improve snow digging and snow trapping effects, as the snow is trapped and compacted inside the 3D recesses, and/or between the 3D protrusions, when the tire 1 is in use.

Preferably, each of said alternating recesses and/or protrusions is shaped as a double-curved element but, according to preferred embodiments of the inventions, it can present also a prismatic shape (embodiment of FIG. 4b e 4c) or a pyramidal shape. Otherwise, various regions of external surface, each presenting different shapes of recesses and/or protrusions, could be provided at the same block wall.

Figure 4B:
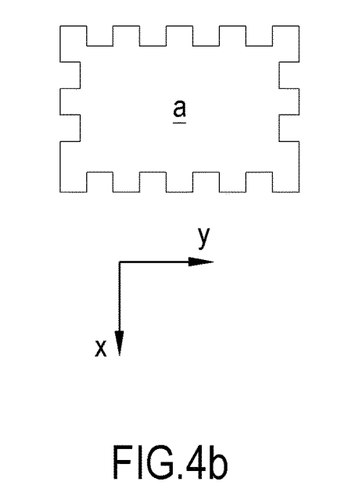
Figure 4C:
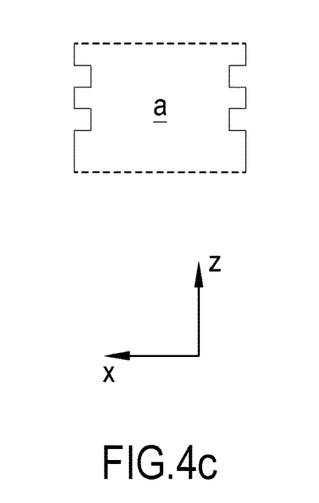

As way of example, FIGS. 4b e 4c show a plan view and a lateral view of a preferred embodiment of a tread block a according to the present invention, respectively. The tread block a presents a prismatic shape defined by four perimetral walls, namely a first couple of longitudinal perimetral walls, and a second couple of transversal perimetral walls. Preferably, all external surfaces of the four perimetral walls bear alternating recesses and/or protrusions presenting a prismatic shape, creating a 3D pattern.

More in general, the alternation of recesses and/or protrusions realizes a sort of 3D checkerboard pattern on the external surface of a tread land portion, in particular of a tread block.

According to other embodiments of the invention, a 3D pattern according to what already described could be provided to the external surface of only one perimetral wall, or two opposite perimetral walls (preferably, a couple of transversal perimetral walls), or—of course—all the perimetral walls of the tread block, as already said. The 3D pattern could be provided to a whole external surface of a respective perimetral wall, or only to a limited portion thereof.

Preferably, the distance between consecutive recesses and/or protrusions, measured according a direction parallel to the external surface of the perimetral wall on which they are provided to, is constant.

Figure 5:
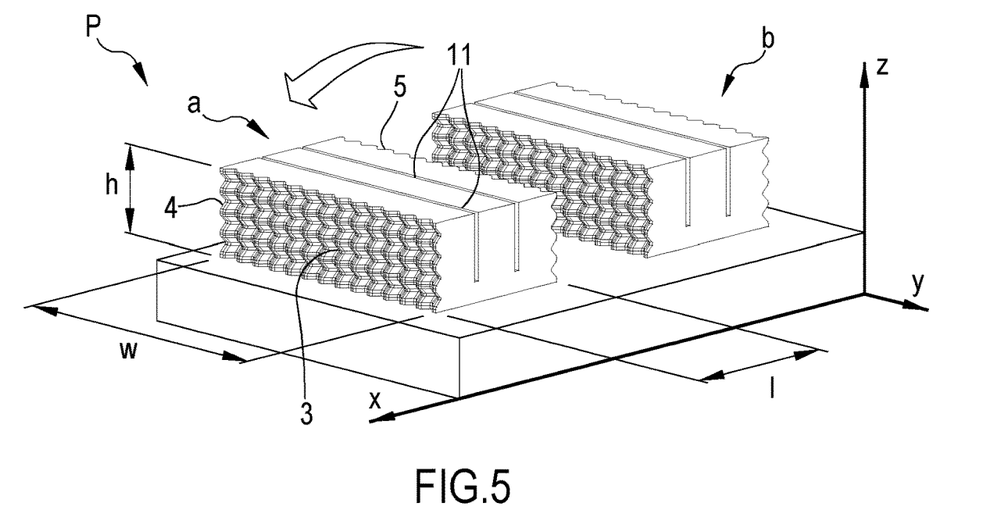
FIG. 5 shows more in detail a lateral, prospective view of a preferred embodiment of tread block according to the present invention.

With reference to FIG. 5, another preferred embodiment of a tread portion P according to the present invention is shown. For better clarity, an arrow indicates the rolling direction of the tire comprising the tread portion P (the tire is not represented in FIG. 5). The tread portion P comprises, as way of example, two tread blocks respectively designed by reference letters a and b, but the following description will refer to tread block a only. However, all the following considerations about tread block a are to be intended as extended to tread block b, too (or to any other tread block comprised in a tire according to the present invention).

As can be clearly seen in FIG. 5, the 3D pattern of the invention is intended to be provided to external, perimetral faces or walls which define the tread portion or more in particular the tread block, which faces or walls are not intended to comprise inner walls provided within tread block body, such as walls defining the sipes 11.

The tread block a has preferably a prismatic shape and comprises four perimetral walls, namely a first couple 3, 5 ad a second couple 2, 4 of perimetral walls, wherein in general the walls of each couple are substantially opposite to each other. In particular, tread block a comprises two longitudinal perimetral walls 2, 4 extending according said circumferential and radial directions C, R and two transversal perimetral walls 3, 5 extending according said transversal and radial directions T, R.

Preferably, a whole external surface 10 of each of the two perimetral walls of the first couple 3, 5, or of the second couple 2, 4, is provided with the 3D pattern of alternating recesses 6 and/or protrusions 7.

Figure 6:
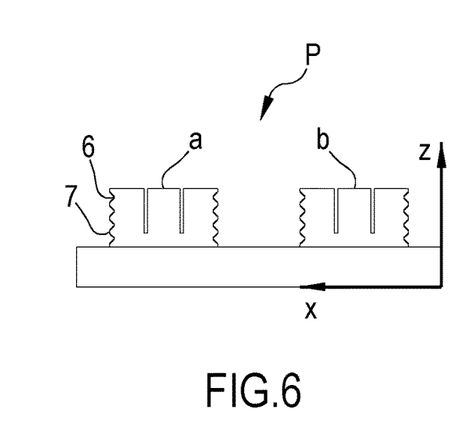
FIGS. 6 and 7 show, respectively, a lateral view and a plan view of the preferred embodiment of tread block according to FIG. 5.
Figure 7:
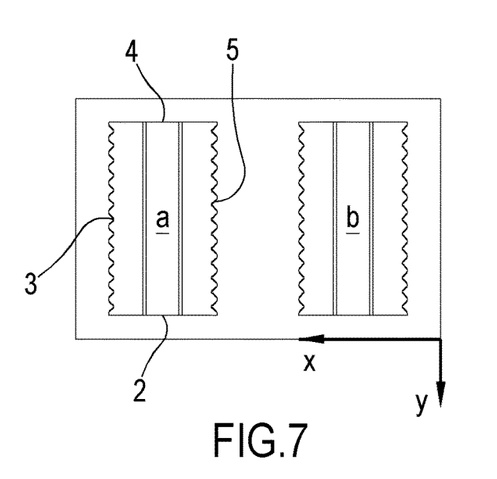
Figure 8:
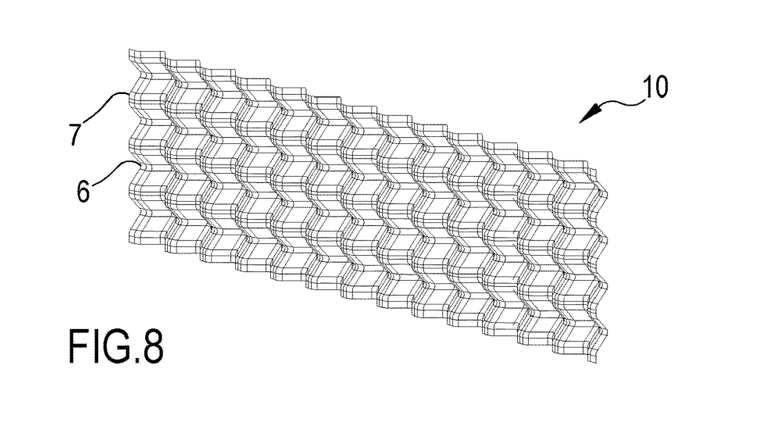
FIG. 8 shows in greater detail an external 3-dimensional patterned surface of the tread block of FIG. 5.

That is, according to a preferred embodiment, a whole external surface 10 of both said two transversal perimetral walls 3, 5 bears the 3D pattern of alternating recesses 6 and/or protrusions 7, as can be seen also in FIGS. 6 and 7. An increased view of the 3D patterned external surface 10 is shown in FIG. 8.

According to another preferred embodiment of the invention, a whole external surface 10 of two consecutive perimetral walls of tread block a (with reference to FIGS. 6 and 7, consecutive perimetral walls being denoted by the numeral references 2, 3 or 3, 4 or 4, 5 or 5, 2) could bear the 3D pattern of alternating recesses and/or protrusions.

Alternatively, a whole external surface 10 of three perimetral walls of tread block a could bear the 3D pattern of alternating recesses and/or protrusions.

Figure 9:
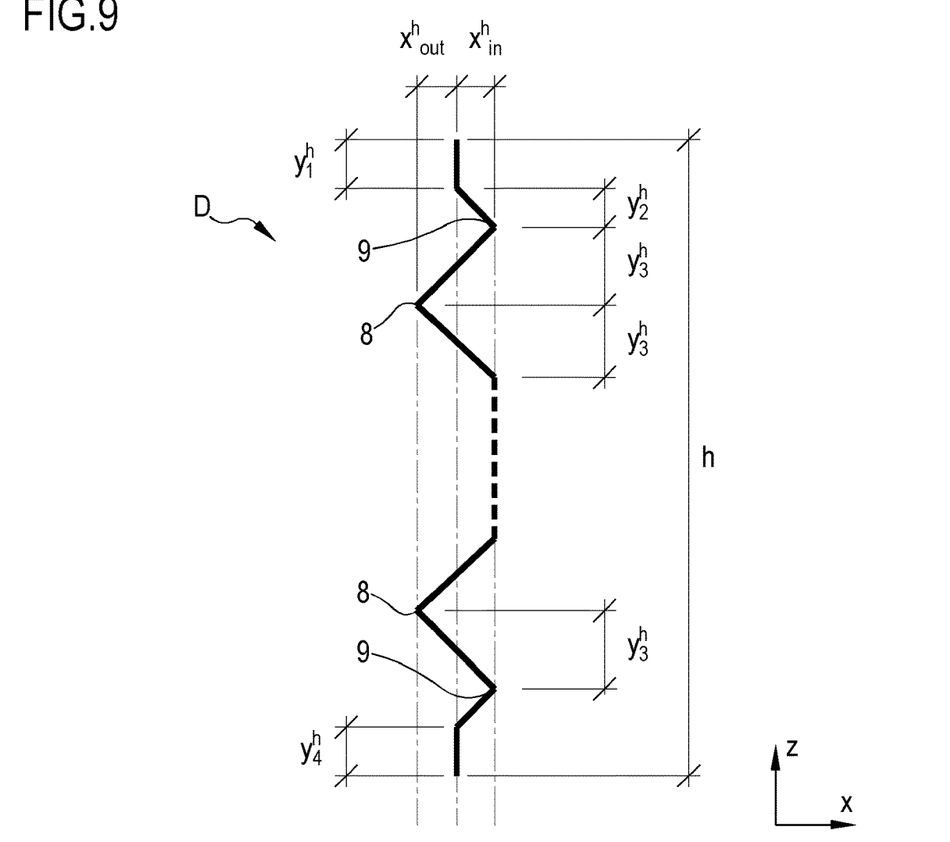
FIG. 9 shows the geometrical features of a directrix line D according to the present invention.
Figure 10:
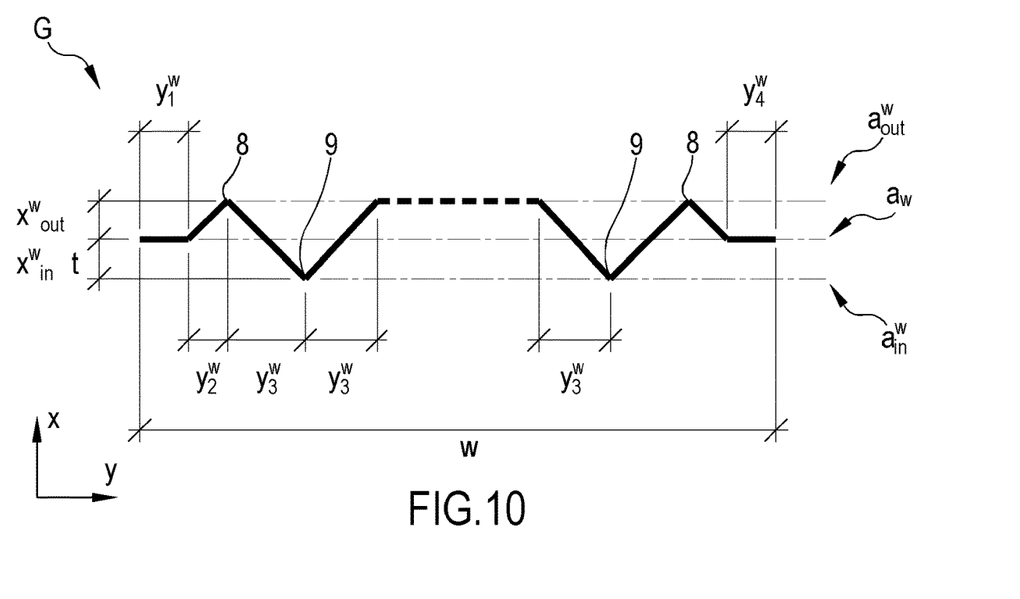
FIG. 10 shows the geometrical features of a generatrix line G according to the present invention.

Preferably, the 3D pattern of alternating recesses and/or protrusions is realized by means of a wavy generatrix G swept along a wavy directrix D path, the preferred embodiments of lines G and D being shown in FIGS. 10 and 9, respectively. The generatrix G and directrix D both comprise crest points 8, which are most external points of a respective external surface 10, and trough points 9, which are most internal points of a respective external surface 10.

It is to be noted that, in the present disclosure, also a zigzag line which presents a bend radius different than zero at its crest points and trough points is intended to be a wavy line.

With reference to FIG. 9, the directrix D is shown, corresponding to the external profile of the tread block 3D patterned surface according to a x-z plane section. With reference to FIG. 10, the generatrix G is shown, corresponding to the external profile of the tread block 3D patterned surface according to a x-y plane section.

In particular, the 3D pattern has been generated by means of the generatrix G profile (on plane x-y, as shown in FIG. 10) swept along the directrix D profile (on plane x-z, as shown in FIG. 9).

According to a preferred embodiment of the invention, the distance between consecutive crest points 8 and trough points 9, measured according to the longitudinal direction x, which is a direction parallel to said external surface 10, is constant. Preferably, the height $x^h_{out}$, $x^w_{out}$ of the crest points 8 with respect to the external surface 10, measured according to the transversal direction y, is constant. The depth $x^h_{in}$, $x^w_{in}$ of the trough points 9 with respect to the external surface 10 can be constant, too.

More particularly, the height $x^h_{out}$, $x^w_{out}$ of the crest points 8 with respect to the external surface 10 can be comprised between 0 and 4 mm, preferably between 0.5 and 3 mm. On the other side, the depth $x^h_{in}$, $x^w_{in}$ of the trough points 9 with respect to the external surface 10 can be comprised between 0 and 4 mm, preferably between 0.5 and 3 mm.

Preferably, the distance $y^h_3$, $y^w_3$ between consecutive crest points 8 and trough points 9, measured according a transversal direction y parallel to said external surface 10, is comprised between 0.5 and 7.5 mm, preferably between 0.5 and 5 mm. Still preferably, the distance between each of the crest points 8 and trough points 9, measured according a longitudinal direction x orthogonal to said external surface 10 is equal at most to 8 mm, preferably comprised between 0.5 and 6 mm.

In particular, the wavy generatrix G and/or the wavy directrix D present a bend radius equal to 0.2 mm at each of crest points 8 and trough points 9 (not shown in FIGS. 9 and 10). According to other embodiments, the bend radius could be at most equal to 2 mm, more preferably comprised between 0.2 and 1.5 mm.

According to other embodiments of the invention, the 3D pattern of alternating recesses and/or protrusions could be realized by means of a zigzag generatrix swept along a zigzag directrix (wherein the zigzag generatrix and directrix have bend radius different than zero at their crest points and trough points). In such a case, the recesses and/or protrusions generated would have a pyramidal shape.

The aim of the introduction of a complex 3D pattern is to maximize the presence of grooves/cuts/voids (properly shaped and spaced) on tread land portions (in particular tread block) walls, in order to get snow trapped in them. Trapped snow will be compacted, resulting in increasing longitudinal shear forces and in turn the overall gripping effect.

The more external surface of the tread blocks is provided with a 3D pattern of recesses and/or protrusions according to the invention, the more the snow performance is improved. As intended by those skilled in the art that, depending on the selection of the external surfaces of the tread land portions provided with the 3D-pattern, it is possible to improve traction and/or braking and/or cornering on snow, and even all of said features at the same time.

Referring to FIGS. 5, 9 and 10, preferred dimensional values of the generatrix G and directrix D lines are reported below (aw and ah indicate the original quote of a flat external surface 10, with no recesses and protrusions applied thereon).

| | Preferred range | | | |
|---|---|---|---|---|
| Range | Min. Dimension [mm] | Max. Dimension [mm] | Min. Dimension [mm] | Max. Dimension [mm] |
| $x^h_{out}$ | 0 | 4 | 0.25 | 3 |
| $x^h_{in}$ | 0 | 4 | 0.25 | 3 |
| $y^h_1$ | 0 | 2.5 | 0.3 | 2 |
| $y^h_2$ | 0 | 4 | 0 | 2.5 |
| $y^h_3$ | 0.5 | 7.5 | 0.5 | 5 |
| $y^h_4$ | 0 | 2.5 | 0.3 | 2 |
| $x^w_{out}$ | 0 | 4 | 0.25 | 3 |
| $x^w_{in}$ | 0 | 4 | 0.25 | 3 |
| $y^w_1$ | 0 | 2.5 | 0.3 | 2 |
| $y^w_2$ | 0 | 4 | 0 | 2.5 |
| $y^w_3$ | 0.5 | 7.5 | 0.5 | 5 |
| $y^w_4$ | 0 | 2.5 | 0.3 | 2 |
| $x^l_{out}$ | 0 | 4 | 0.25 | 3 |
| $x^l_{in}$ | 0 | 4 | 0.25 | 3 |
| $y^l_1$ | 0 | 2.5 | 0.3 | 2 |
| $y^l_2$ | 0 | 4 | 0 | 2.5 |
| $y^l_3$ | 0.5 | 7.5 | 0.5 | 5 |
| $y^l_4$ | 0 | 2.5 | 0.3 | 2 |

Experimental Data

An experimental campaign has been performed to prove how much the invention allows to improve snow performances of tires.

The experimental campaign consisted of providing three rubber blocks prototypes sliding on a snow track under the same working conditions, according to fixed velocity, temperature and applied pressure, with a controlled temperature.

A first rubber block without cuts (Solution A), a second rubber block according to the prior art (Solution B) and a third rubber block according to the invention (Solution C) have been provided.

Each of the rubber blocks subject of the experimental campaign presents the same overall dimensions.

With reference to FIG. 3b, the tread block of prior art solution B is provided with a pattern of recesses and protrusions presenting the following dimensions:

| Item | Dimension |
|---|---|
| $x^b$ | 0.75 mm |
| $y^{b1}$ | 1.5 mm |
| $y^{b2}$ | 2 mm |
| $r^b$ | 0.3 mm |

-continued

| Item | Dimension |
|---|---|
| $\alpha^b$ | 90° |

Dimensions of tested Solution C according to the present invention:

| Item | Dimension [mm] |
|---|---|
| $x^h_{out}$ | 0.2 |
| $x^h_{in}$ | 0.75 |
| $y^h_1$ | 0.4 |
| $y^h_2$ | 0.75 |
| $y^h_3$ | 0.95 |
| $y^h_4$ | 0.4 |
| $x^w_{out}$ | 0.2 |
| $x^w_{in}$ | 0.75 |
| $y^w_1$ | 0.4 |
| $y^w_2$ | 0.75 |
| $y^w_3$ | 0.95 |
| $y^w_4$ | 0.4 |

The bend radius in Solution C is equal to 0.2 mm.

Figure 11:
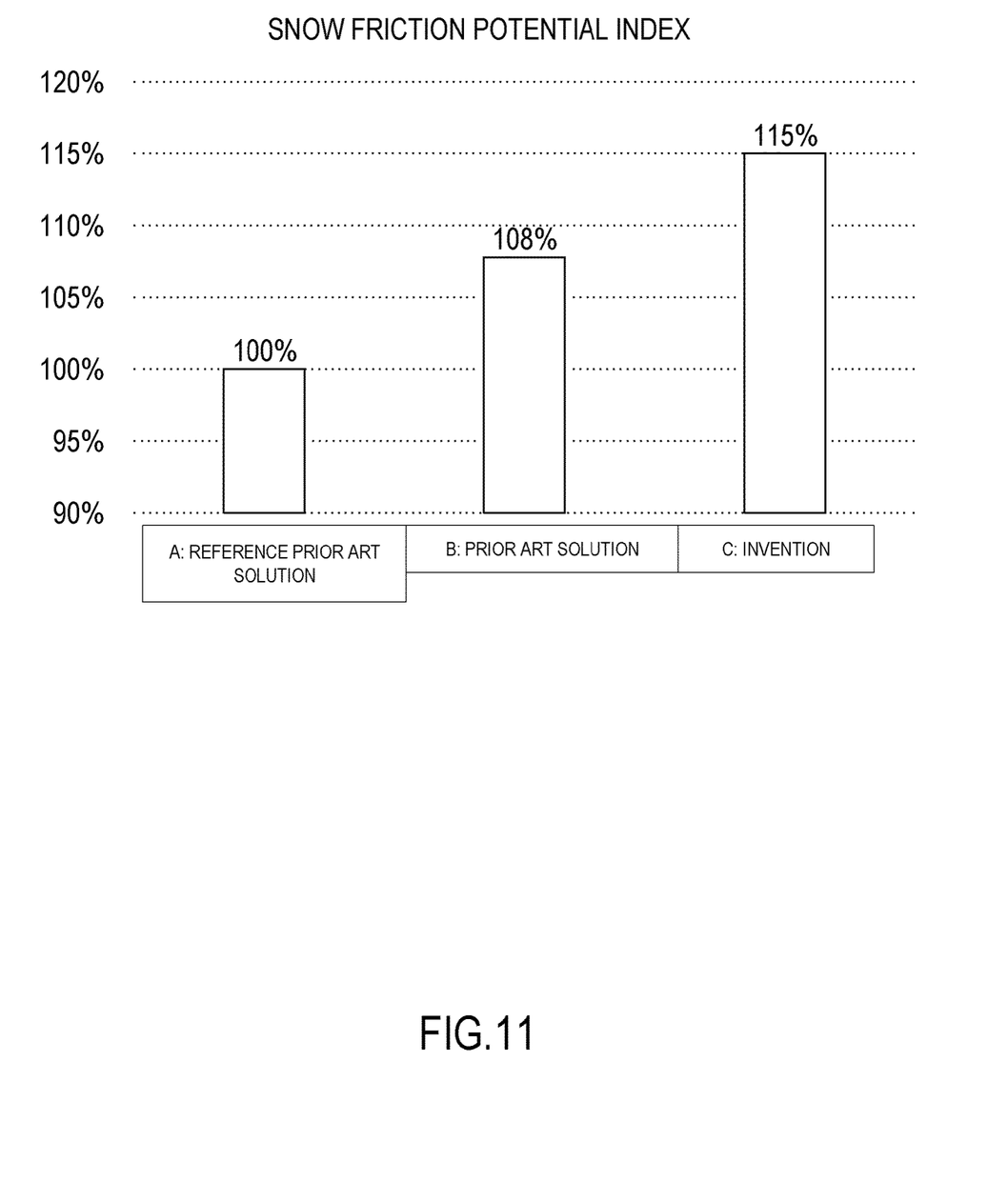
FIG. 11 is a histogram showing the potential index referred to snow friction with reference to prototypes of a first prior art tread block (solution A), a second prior art tread block (solution B) and a preferred embodiment of tread block according to the present invention (solution C), respectively.

Experimental results are showed in the histogram of FIG. 11, in terms of different potential index of snow friction coefficient (snow friction coefficient is the ratio between Longitudinal Force Fx and Normal Force Fz), wherein high friction was desired, of course.

The snow friction potential index of the proposed Solution C is higher than that of tested Solutions A and B.

The present invention has been up to here described with reference to preferred embodiments. It is to be intended that other embodiments are possible within the same inventive core, as defined by the scope of protection of the following claims.

The invention claimed is:

1. A tire presenting a circumferential direction, a radial direction, and a transversal direction, and comprising:
    an external tread portion which comprises a tread block, the tread block comprising a plurality of lateral external perimetral walls;
    wherein at least one of the external perimetral walls bears a three-dimensional pattern of recesses and/or protrusions along the length of the external perimetral wall;
    wherein the recesses and/or protrusions alternate to each other according to at least two spatial directions of the external surface
    wherein the three-dimensional pattern of alternating recesses and/or protrusions is realized using a wavy generatrix swept along a wavy directrix, the wavy generatrix and the wavy directrix each comprising crest points, which are most external points of a respective external surface of the external perimetral wall, and trough points, which are most internal points of the respective external surface of the external perimetral wall, and
    wherein the external perimetral wall bearing the three-dimensional pattern of recesses and/or protrusions is not a wall defining a sipe.

2. The tire of claim 1, wherein the at least two spatial directions are perpendicular to each other.

3. The tire of claim 1, wherein a distance between consecutive recesses and/or protrusions, measured according to a direction parallel to the external surface, is constant.

4. The tire of claim 1, wherein a whole external surface of one of the perimetral walls bears the three-dimensional pattern of alternating recesses and/or protrusions.

5. The tire of claim 1, wherein a whole external surface of two opposing ones of the perimetral walls bears the three-dimensional pattern of alternating recesses and/or protrusions.

6. The tire of claim 1, wherein a whole external surface of two consecutive ones of the perimetral walls bears the three-dimensional pattern of alternating recesses and/or protrusions.

7. The tire of claim 1, wherein a whole external surface of three of the perimetral walls bears the three-dimensional pattern of alternating recesses and/or protrusions.

8. The tire of claim 1, wherein a whole external surface of all the perimetral walls bears the three-dimensional pattern of alternating recesses and/or protrusions.

9. The tire of claim 1, wherein a distance between consecutive crest points and trough points, measured according to a direction parallel to the external surface, is constant.

10. The tire of claim 1, wherein a height of the crest points with respect to the external surface is constant.

11. The tire of claim 1, wherein a depth of the trough points with respect to the external surface is constant.

12. The tire of claim 1, wherein a height of the crest points with respect to the external surface is from 0 to 4 mm.

13. The tire of claim 12, wherein the height of the crest points with respect to the external surface is from 0.25 to 3 mm.

14. The tire of claim 1, wherein a depth of the trough points with respect to the external surface is from 0 to 4 mm.

15. The tire of claim 1, wherein a distance between consecutive crest points and trough points, measured according to a direction parallel to the external surface, is from 0.5 to 7.5 mm.

16. The tire of claim 1, wherein a height of the crest points with respect to the trough points, measured according to a direction orthogonal to the external surface, is equal to or less than 8 mm.

17. The tire of claim 1, wherein the wavy generatrix and/or the wavy directrix present a bend radius equal to 0.2 mm at each of the crest points and trough points.

18. The tire of claim 1, wherein the alternating recesses and/or protrusions presents a prismatic or pyramidal shape.

19. The tire of claim 1, wherein the three-dimensional pattern of alternating recesses and/or protrusions is realized via a zigzag generatrix swept along a zigzag directrix.

* * * * *